United States Patent
Kamata et al.

(10) Patent No.: US 10,449,506 B2
(45) Date of Patent: Oct. 22, 2019

(54) REACTOR AND REACTION SYSTEM

(71) Applicant: IHI CORPORATION, Tokyo (JP)

(72) Inventors: Hiroyuki Kamata, Tokyo (JP); Takuya Yoshinoya, Tokyo (JP)

(73) Assignee: IHI CORPORATION, Tokyo (JP)

(*) Notice: Subject to any disclaimer, the term of this patent is extended or adjusted under 35 U.S.C. 154(b) by 0 days.

(21) Appl. No.: 16/043,422

(22) Filed: Jul. 24, 2018

(65) Prior Publication Data
US 2018/0326387 A1 Nov. 15, 2018

Related U.S. Application Data

(63) Continuation of application No. PCT/JP2017/006600, filed on Feb. 22, 2017.

(30) Foreign Application Priority Data

Feb. 23, 2016 (JP) ................. 2016-031863

(51) Int. Cl.
*B01J 19/00* (2006.01)
*F28F 3/08* (2006.01)
(Continued)

(52) U.S. Cl.
CPC ......... *B01J 19/0013* (2013.01); *B01J 19/249* (2013.01); *F28D 9/00* (2013.01);
(Continued)

(58) Field of Classification Search
CPC .. B01J 19/0013; B01J 19/249; B01J 19/0093; B01J 19/242; B01J 19/245;
(Continued)

(56) References Cited

U.S. PATENT DOCUMENTS 4,431,751 A * 2/1984 Hohlein .................... C07C 1/02
122/4 D
7,226,574 B2 6/2007 Long et al.
(Continued)

FOREIGN PATENT DOCUMENTS

JP 2002-292274 A 10/2002
JP 2004-053545 A 2/2004
(Continued)

OTHER PUBLICATIONS

European Patent Office, "Extended European Search Report," issued in European Patent Application No. 17 756 537.1, which is a European counterpart of U.S. Appl. No. 16/043,422, dated Jun. 27, 2019, 13 pages.

*Primary Examiner* — Lessanework Seifu (57) ABSTRACT

The reactor has a heat exchanging body which includes therein a heat medium flow channel in which heat medium fluid is caused to flow, a reaction flow channel in which a reaction fluid containing a first reactant (and a second reactant) is caused to flow, and a supplement channel for supplying a second reactant at an intermediate portion of the reaction flow channel. A catalyst is provided in the reaction flow channel and promotes the reaction in the reaction fluid. The heat exchanging body has a plurality of holes through which the supplement channel communicates with the reaction flow channel. Steam reforming can be performed using water vapor and hydrocarbon as the first and second reactants.

4 Claims, 6 Drawing Sheets

(51) Int. Cl.
*F28D 9/00* (2006.01)
*B01J 19/24* (2006.01)
*F28F 21/08* (2006.01)
*C01B 3/38* (2006.01)
*F28D 21/00* (2006.01)

(52) U.S. Cl.
CPC ......... *F28D 9/0043* (2013.01); *F28D 9/0093* (2013.01); *F28F 3/08* (2013.01); *F28F 21/083* (2013.01); *F28F 21/087* (2013.01); *B01J 2219/00085* (2013.01); *B01J 2219/247* (2013.01); *B01J 2219/2453* (2013.01); *B01J 2219/2458* (2013.01); *B01J 2219/2462* (2013.01); *B01J 2219/2479* (2013.01); *B01J 2219/2493* (2013.01); *C01B 3/384* (2013.01); *C01B 2203/0233* (2013.01); *C01B 2203/0283* (2013.01); *C01B 2203/0833* (2013.01); *C01B 2203/1235* (2013.01); *C01B 2203/1276* (2013.01); *C01B 2203/142* (2013.01); *F28D 2021/0022* (2013.01); *Y02P 20/52* (2015.11)

(58) Field of Classification Search
CPC .... B01J 2219/00783; B01J 2219/00804; B01J 2219/00813; B01J 2219/00085; B01J 2219/00096; B01J 2219/0004; B01J 2219/00867
See application file for complete search history.

(56) References Cited

U.S. PATENT DOCUMENTS

| | | | |
|---|---|---|---|
| 7,500,998 | B2* | 3/2009 | Komaki ................ B01J 8/0438 422/207 |
| 7,935,734 | B2* | 5/2011 | Tonkovich ........... B01J 19/0093 518/700 |
| 2007/0292342 | A1* | 12/2007 | Hemmings ............. C01B 3/382 423/651 |
| 2009/0004074 | A1 | 1/2009 | Tonkovich et al. |
| 2009/0064579 | A1 | 3/2009 | Wakasugi et al. |
| 2012/0149788 | A1 | 6/2012 | Ahmed et al. |
| 2013/0122384 | A1 | 5/2013 | Kani et al. |

FOREIGN PATENT DOCUMENTS

| | | |
|---|---|---|
| JP | 2007-015872 A | 1/2007 |
| JP | 2007-297238 A | 11/2007 |
| JP | 2009-018280 A | 1/2009 |
| JP | 2012-246170 A | 12/2012 |
| JP | 2013-501700 A | 1/2013 |
| JP | 2016-023107 A | 2/2016 |
| WO | 2007/076393 A2 | 7/2007 |
| WO | 2011/148604 A1 | 12/2011 |

* cited by examiner

REACTOR AND REACTION SYSTEM

CROSS REFERENCE TO RELATED APPLICATIONS

This application is a continuation application of International Application No. PCT/JP2017/006600, filed on Feb. 22, 2017, which claims priority of Japanese Patent Application No. 2016-031863, filed on Feb. 23, 2016, the entire contents of which are incorporated by reference herein.

BACKGROUND

Technical Field

The present disclosure relates to a heat exchange-type reactor and a reaction system for causing a chemical reaction of a reactant to progress by heating or cooling a reaction fluid being a fluid containing the reactant (reaction raw material) with use of heat exchange with a heat medium fluid.

Description of the Related Art

Heat exchange-type reactors are known as chemical reactors that heat or cool a fluid in a gaseous or liquid state containing a reactant (reaction raw material) to cause a thermal reaction (endothermic reaction, exothermic reaction) of the reactant to progress. In such a reactor, a reaction flow channel in which a reaction fluid is caused to flow and a heat medium flow channel in which a heat medium fluid is caused to flow are provided in the apparatus. The reactor is configured such that while the reaction fluid and the heat medium fluid are respectively supplied from an entrance and discharged from an exit, heat exchange between them progresses. In general, to facilitate the heat exchange, the reaction flow channel and the heat medium flow channel, provided in the reactor, are each formed to branch into a plurality of flow channels, thereby increasing the heat transfer area. Also, since the progress of a chemical reaction can be promoted by use of a catalyst, placing a catalyst inside the reaction flow channel can improve the efficiency of the reaction inside the reaction flow channel. Such a reactor can be utilized as an apparatus that carries out a thermal reaction such as a methane steam reforming reaction or dry reforming reaction at a production or purification plant of a natural gas, synthesis gas, hydrogen gas, or the like, and its importance has been growing with the increase in interest in hydrogen producing techniques in recent years.

The reaction rate and reaction efficiency of a chemical reaction vary depending on reaction conditions. Then, for a chemical reaction to progress well with suitable reaction efficiency, a reactor is preferably configured such that the composition (reactant concentration), supply rate, and so on of the reaction fluid to be supplied to the reactor are adjustable. Japanese Patent Application Laid-open No. 2012-246170 (Publication Document 1 listed below) discloses a hydrogen production apparatus and a fuel cell system that produce hydrogen by supplying a raw material and water to a reformer that performs steam reforming utilizing the heat of combustion air, and mentions that either one of the amount of water to be supplied to the reformer or the combustion air is controlled such that the temperature of the reformer can be a predetermined temperature. Thus, controlling the supply of a raw material can make reaction conditions better.

Meanwhile, Re-publication of PCT International Publication No. WO2011/148604 (Publication Document 2 listed below) also discloses a fuel cell system including a reformer that produces hydrogen by steam reforming. This literature, however, mentions that, after the supply of the raw material and water is stopped, the supply of the raw material gas is controlled to supply the raw material gas to the reformer in order to suppress deterioration of the reforming catalyst by residual water.

DOCUMENTS LIST

Publication Document 1: Japanese Patent Application Laid-open No. 2012-246170

Publication Document 2: Re-publication of PCT International Publication No. WO2011/148604

BRIEF SUMMARY

Problems with the reaction catalyst used in a steam reforming reaction include not only the above-mentioned deterioration after stopping the reaction but also the fact that carbon is produced and deposited on the surface of the catalyst as the reaction progresses. If carbon deposition occurs, it covers the catalyst and obstructs the contact with the reactant, thereby making the reaction difficult. Accordingly, the reaction efficiency decreases, and the catalyst needs to be replaced often. The carbon deposition can be suppressed by supplying water vapor in excess of the stoichiometric amount. However, since supplying steam involves large energy consumption, it is desirable that the amount of steam to be supplied may be reduced as much as possible. The concentration of the raw material gas becomes relatively low, which is also disadvantageous in terms of reaction efficiency and product recovery efficiency. Thus, there is a need for a technical improvement that can suppress carbon deposition while reduction of the amount of steam to be supplied is also possible.

Generation of undesirable by-products is often found not only in steam reforming reactions but in various chemical reactions. Although the solution to this varies by the type of reaction, it usually involves modifying the reaction form such that the reactants are reacted with each other in a ratio different from the stoichiometric ratio. Then, a technical improvement for suppressing generation of a by-product during the progress of a chemical reaction as above and also enhancing the reaction efficiency is important. Providing a heat exchange-type reactor with such a technical improvement can be very useful means not only for steam reforming reactions but also for various chemical reactions in industrial production, and can achieve efficient progress of a reaction while also suppressing generation of a by-product.

The present disclosure solves such problems, and an object thereof is to provide a heat exchange-type reactor and reaction system that can realize suppression of a by-product while bringing the supply of reactants into a ratio close to their stoichiometric ratio, in a reaction in which the reactants ratio capable of suppressing generation of a by-product is different from the stoichiometric ratio.

To solve the above problems, the present inventors have conducted earnest studies on the configuration of a heat exchange-type reactor and found out an apparatus configuration and system configuration that can supply reactants in a ratio close to their stoichiometric ratio while also reducing generation of by-products. As a result, the present inventors have accomplished the technique of the present disclosure.

According to an aspect of the present disclosure, the reactor is summarized as a reactor that causes a reaction in a reaction fluid to progress by utilizing heat exchange between a heat medium fluid and the reaction fluid, including: a heat exchanging body that has therein a heat medium flow channel in which the heat medium fluid is caused to flow, a reaction flow channel in which a reaction fluid containing a first reactant is caused to flow, and a supplement channel which is caused to supply a second reactant at an intermediate portion of the reaction flow channel; and a catalyst that is provided in the reaction flow channel and promotes the reaction in the reaction fluid.

The above reactor can be configured such that the heat exchanging body is formed to include a plurality of holes through which the supplement channel communicates with intermediate portions of the reaction flow channel, and the second reactant is supplied to the reaction fluid in the reaction flow channel intermittently through the plurality of holes. It is convenient if the reactor is configured such that it further includes: a distributor that divides the second reactant into a portion and a remaining portion; and a mixer that produces a mixture containing the portion of the second reactant divided by the distributor and the first reactant, and that the distributor supplies the remaining portion of the second reactant to the supplement channel, and the mixer supplies the mixture as the reaction fluid to the reaction flow channel. It is suitable to use a distributor in which a ratio of dividing the second reactant is adjustable. In a case of using the above reactor for steam reforming of a hydrocarbon, the first reactant contains water vapor, and the second reactant contains the hydrocarbon.

Also, according to an aspect of the present disclosure, the reaction system is summarized as a reaction system that causes a reaction between a first reactant and a second reactant to progress by utilizing heat exchange between a heat medium fluid and a reaction fluid, including: a first reaction unit that causes the reaction between the first reactant and the second reactant to progress in the reaction fluid containing the first reactant and a portion of the second reactant, by utilizing heat exchange with the heat medium fluid; a mixing unit that supplements a remaining portion of the second reactant to the reaction fluid discharged from the first reaction unit; and a second reaction unit that causes the reaction between the first reactant and the second reactant to progress in the reaction fluid to which the remaining portion of the second reactant has been supplemented by the mixing unit, by utilizing heat exchange with the heat medium fluid, in which each of the first reaction unit and the second reaction unit includes a heat exchanging body provided therein with a catalyst that promotes the reaction between the first reactant and the second reactant.

The heat exchanging body may have therein a heat medium flow channel in which the heat medium fluid is caused to flow and a reaction flow channel in which the reaction fluid is caused to flow, and the catalyst may be provided in the reaction flow channel. The reaction system may be configured such that it further includes a distributor that divides the second reactant into a portion and a remaining portion, wherein a mixture containing the portion of the second reactant divided by the distributor and the first reactant is supplied as the reaction fluid to the first reaction unit, and the distributor supplies the remaining portion of the second reactant to the mixing unit.

Moreover, according to an aspect of the present disclosure, a reaction method executable using the above reactor or reaction system is a reaction method of causing a reforming reaction in a reaction fluid to progress by utilizing heat exchange between a heat medium fluid and the reaction fluid, including: a dividing process of dividing a hydrocarbon into a portion and a remaining portion; a reaction process of causing a reforming reaction of the hydrocarbon to progress by heat exchange between the reaction fluid containing the portion of the hydrocarbon and an oxidant in the presence of a catalyst; and a supplement process of supplying the remaining portion of the hydrocarbon to the reaction fluid during the reaction process. The amounts of the hydrocarbon and the oxidant to be used may be adjusted such that the ratio of the amount of the oxidant to the amount of the hydrocarbon in the initial reaction fluid supplied to the reactor and the ratio of the amount of the oxidant to the amount of the hydrocarbon in the reaction fluid to which the hydrocarbon has been supplemented in the supplement process be optimum ratios for the reforming reaction.

According to the present disclosure, a reactor is provided such that, in regard to a thermal reaction carried out with a reactant ratio different from the stoichiometric ratio, such as steam reforming reactions, the ratio of reactants is possibly brought close to their stoichiometric ratio while suppressing by-products and the like, and that can therefore improve conditions and efficiency of the thermal reaction. This can contribute in a chemical synthesis utilizing a thermal reaction to cost reduction through improvements in durability and usage life of the reaction catalyst, and also to stable supply of the target reaction product and reduction of the production cost.

BRIEF DESCRIPTION OF DRAWINGS

FIG. 4 is a set of views for explaining the configurations of flow channels in the heat exchanging body.

DETAILED DESCRIPTION OF EMBODIMENTS

A heat exchange-type reactor is a reactor including a heat exchanging body having therein a heat medium flow channel in which a heat medium fluid is caused to flow and a reaction flow channel in which a reaction fluid containing a reactant is caused to flow. It heats or cools the reaction fluid, using heat exchange between the heat medium fluid and the reaction fluid, to cause a thermal reaction of the reactant to progress. In a case of carrying out steam reforming using such a reactor, the reactants (i.e. a reaction raw material and a substance involved in the chemical reaction) are water vapor (first reactant) and a hydrocarbon compound (second reactant). The water vapor functions as an oxidant. For example, methane and water vapor react with each other in accordance with a steam reforming reaction as described in formula (1) below. Also, in a dry reforming reaction in which reforming is performed using carbon dioxide as an oxidant, the reaction progresses as described in formula (2) below. These reactions are endothermic reactions, and the reactions progress in response to heating with the heat medium fluid.

$$CH_4 + H_2O \rightarrow 3H_2 + CO \quad \text{Formula (1)}$$

[If generalized to hydrocarbon: $C_nH_m + nH_2O \rightarrow (n+m/2)H_2 + nCO$]

$$CH_4 + CO_2 \rightarrow 2H_2 + 2CO \quad \text{Formula (2)}$$

As understood from the formula (1), the stoichiometric ratio between water vapor and methane in a steam reforming reaction is 1/1. In principle, the reaction is supposed to progress well when a mixture gas containing water vapor and the hydrocarbon in a ratio of 1 to 1 is supplied to and heated in the reactor. In practice, however, carbon is deposited (coking) as a by-product and covers the surface of the reaction catalyst. This impedes the catalyst's action and the catalyst is likely to decline in activity or deteriorate. Accordingly, the reaction efficiency decreases and replacement of the catalyst is required. Thus, the cost required for the catalyst and the cost required for performance adjustment and maintenance of the reactor become a problem. There are a plurality of reactions that involve deposition of carbon, and examples include a decomposition reaction (see formula (a) below) of the hydrocarbon which is the raw material gas, a disproportionation reaction of the resultant carbon monoxide (see formula (b) below), and so on. Other reactions include reactions caused by a small amount of an unsaturated hydrocarbon or aromatic component contained in the raw material gas, and so on.

$$CH_4 \rightarrow C + 2H_2 \quad \text{Formula (a)}$$

$$2CO \rightarrow C + CO_2 \quad \text{Formula (b)}$$

Deposition of carbon is likely to occur when the ratio of water vapor to the carbon number of the hydrocarbon (S/C ratio: Steam to Carbon ratio) is small, and deposition of carbon is also likely to occur when a hydrocarbon with a large number of carbon atoms is used. Meanwhile, it has been known that the shift reaction, in which carbon dioxide and hydrogen are generated from carbon monoxide and water vapor, progresses in the catalyst simultaneously with the steam reforming reaction of formula (1). Hence, the steam reforming reaction is typically performed by mixing an excess amount of steam in advance to the raw material gas to be supplied to the reactor, thereby greatly increasing the S/C ratio, and supplying the raw material gas in this state to the reactor. For example, in a case of using a natural gas being rich in methane, or the like, as the raw material, it is reacted in an S/C ratio of about 2.5 to 3. In a case of using LPG, naphtha, or the like, containing a component with a large number of carbon atoms, it is reacted in a higher S/C ratio than that with the natural gas to perform the steam reforming. By setting a high S/C ratio as above, deposition of carbon is suppressed. However, since a large amount of steam is used, the energy consumption is large, and the concentration of the raw material gas contained in the gas supplied to the reactor is low, which leads to low reaction efficiency.

The above problems can be solved by modifying the method of supplying the raw material. Specifically, the raw material gas is divided into a plurality of portions, and only a portion is mixed to steam to thereby react it with the steam from the beginning, whereas the remaining portion is supplemented during the reaction. With such a supplying manner, it is possible to configure a reaction form under reaction conditions where the amounts of steam and the raw material gas to be used are in the stoichiometric ratio but the S/C ratio is equal to or larger than the stoichiometric ratio. Specifically, the present disclosure proposes, as an effective way to improve energy consumption and reaction efficiency, configuring a reaction form (reactor, reaction system) to react a first reactant (e.g. steam) and a second reactant (e.g. hydrocarbon) with each other by separating the second reactant into a plurality of portions and successively supplying the second reactant to the first reactant.

Taking a methane steam reforming reaction that uses steam and methane as a first reactant and a second reactant as an example, the reaction form configured by split supply of the second reactant will be considered below, based on approximate calculation simplifying the progress of the reaction.

First, consideration will be given to a case of: separating methane into two of initial portion and supplemental portion; supplying a mixture gas of the initial portion of methane and steam into a reaction flow channel in which a reforming catalyst is mounted; and supplying the supplemental portion of methane in the middle portion of the reaction flow channel. It is noted that, although the above reforming reaction is an equilibrium reaction and a plurality of reactions can progress in parallel in the actual reaction system, the following consideration assumes that only the steam reforming reaction progresses completely in the mixture gas. Since the reaction rate of a steam reforming reaction using the catalyst is very high, the methane contained in the mixture gas is assumed to be consumed by the time it reaches the middle portion of the reaction flow channel, and the methane in the gas at the middle portion of the reaction flow channel is therefore the supplemental portion of methane. Based on this assumption, the following is given: the equivalent ratio (i.e. the S/C ratio with the total amount of methane) of the amount of steam supplied as the mixture gas to the total amount of methane (total of the initial portion and the supplemental portion) is N; and the proportion of the supplemental portion of methane in the total amount of methane is α (0<α<1). Then, the S/C ratio at the beginning of the reaction (denoted as Xi) and the S/C ratio at the middle portion of the reaction flow channel (denoted as Xm) are described as follows. Thus, Xi=2N and Xm=2N-1 when α is 0.5, and the S/C ratio in the period from the beginning to the middle point of the reaction is larger than 1 when N is 1. In other words, reaction with an S/C ratio exceeding 1 is possible using the stoichiometric amount of water vapor.

$$Xi = N/(1-\alpha)$$

$$Xm = [N-(1-\alpha)]/\alpha$$

As α increases, the S/C ratio at the beginning of the reaction (Xi) increases and the S/C ratio at the middle portion (Xm) decreases. Then, the proportion (denoted as αe) of the supplemental portion in a state where these ratios are equal (Xi=Xm) is calculated as the value described below. Further, the S/C ratio at the beginning of the reaction (Xi) and the S/C ratio at the middle portion (Xm) in a state where the split supply is performed at the proportion of the supplemental portion being αe are calculated as described below. With N>1, Xi (=Xm) is the smallest value of the S/C ratio in the reaction flow channel. When the split supply is performed at the proportion of the supplemental portion being αe, the S/C ratio in the reaction flow channel is always higher than the S/C ratio with the total amount of methane (=N).

$$\alpha e = -(N-1) + [N(N-1)]^{1/2}$$

$$Xi(=Xm) = N/\{N - [N(N-1)]^{1/2}\}$$

With N=1.05, αe≅0.18, Xi (=Xm)≅1.28.
With N=1.1, αe≅0.23, Xi (=Xm)≅1.43.
With N=1.3, αe≅0.32, Xi (=Xm)≅1.92.
With N=1.5, αe≅0.36, Xi (=Xm)≅2.36.
With N=2.0, αe≅0.41, Xi (=Xm)≅3.4.

Then, based on the above, the S/C ratio with the total amount of methane (=N) may be calculated by using an S/C ratio conventionally set for the steam reforming reaction as the value of Xi (=Xm), and the split supply may be performed so that the proportion of the supplemental portion equals αe. In this way, it is possible to reduce the amount of steam to be supplied while also suppressing deposition of carbon. In a case of supplying two-divided portions, an S/C ratio of 2.5 to 3 used in conventional methods is achieved by setting the value of N to about 1.6 to 1.8.

Further, also in a case of dividing the supply of methane into three portions, the following is given in the same way as described above: the ratio (i.e. the S/C ratio with the total amount of methane) of the amount of steam supplied as the mixture gas to the total amount of methane (total of the initial portion and the supplemental portions) is N; the proportion of the first supplemental portion of methane within the total amount of methane is α, and the proportion of the second supplemental portion of methane is β (0<α, β<1, 0<α+β<1). Then, the S/C ratio at the beginning of the reaction (denoted as Xi), the S/C ratio at the first supplementation (denoted as X1), and the S/C ratio at the second supplementation (denoted as X2) are as described below.

$$Xi = N/[1-(\alpha+\beta)]$$

$$X1 = [N-1+(\alpha+\beta)]/\alpha$$

$$X2 = (N-1+\beta)/\beta$$

Then, in a case of evenly separating the supply of methane into three portions, Xi=3N, X1=3N−1, and X2=3N−2. When N is 1, the S/C ratio in the period from the beginning of the reaction to the second supplementation is larger than 1. The reaction can therefore be performed with an S/C ratio larger than 1 by using the stoichiometric amount of steam. As in the case of dividing the supply of methane into two portions, proportions αe and βe of the supplemental portions that allow equal S/C ratios at the beginning and the supplements (Xi, X1, and X2) may be calculated from the above equations, and the split supply may be performed so that the proportions of the supplemental portions be αe and βe, respectively. In this way, with N>1, the S/C ratio in the reaction flow channel is always higher than the S/C ratio with the total amount of methane, where the value of Xi (=X1=X2) is the smallest value. Further, based on the above, the S/C ratio with the total amount of methane (=N) may be calculated by using an S/C ratio conventionally set for the steam reforming reaction as the value of Xi (=X1=X2), and the split supply may be performed so that the proportions of the supplemental portions be αe and βe. In this way, it is possible to reduce the amount of steam to be supplied while suppressing deposition of carbon. In the case of supplying three-divided portions, a value of N smaller than that in the case of supplying two-divided portions can be used to achieve a similar S/C ratio. It is easily understood that the value of N can be brought still closer to 1 by increasing the number of portions divided as the supplemental portions (supplement stages).

In the above, a suitable value of the proportion of the divided supplemental portion is calculated from simplified approximate calculation. In practice, however, a plurality of reactions occur in parallel to form an equilibrium state. Hence, the conditions of split supply suitable for practical use can be determined more accurately by checking changes in concentration of the reactants in accordance with the conventional method, utilizing a simulation based on reaction rate analysis. To give an example, changes in concentration of the reactants in a methane steam reforming reaction performed under conditions of a temperature of 800° C. and a pressure of 1 bar are calculated by gas composition calculation via an equilibrium reforming simulation. In this example, if methane is evenly divided into two portions (α=0.5) with the ratio of steam to the total amount of methane being 2 (N=2) (initial S/C ratio=4), the S/C ratio at the time of supplementation of methane is about 2.55 (3 with the approximate calculation), and the final reformed gas (hydrogen yield: 53% of the theoretic amount, containing CO and $CO_2$) can be obtained at a reforming rate of 99.2% (on the basis of the methane concentration). Similarly, if methane is evenly divided into two portions with the ratio of steam to the total amount of methane being 3 (N=3) (initial S/C ratio=6), the S/C ratio at the time of supplementation of methane is about 4.22 (5 with the approximate calculation), and the final reformed gas (hydrogen yield: 65% of the theoretic amount, containing CO and $CO_2$) can be obtained at a reforming rate of 99.75%. By considering the above-mentioned divide proportion α in such a simulation, the value of N with which a suitable S/C ratio can be achieved can be set to be smaller.

Further, when the ratio of the generated hydrogen to methane is small, deposition of carbon is likely to occur due to the progress of the methane decomposition reaction. Split supply of methane works to increase the ratio of hydrogen to methane. In view of this too, split supply of methane is advantageous in suppressing carbon deposition.

Thus, according to the above, it is possible to provide a heat exchange-type reactor and reaction system capable of carrying out a steam reforming reaction with such an amount of steam to be supplied that is reduced to be close to the stoichiometric ratio, while also suppressing deposition of carbon to the surface of the catalyst.

As described above, even in the reaction form that needs to supply a first reactant more than its stoichiometric amount due to reasons such as reduction of a by-product, etc., it is possible with the technique of the present disclosure to bring the amount of the first reactant to be supplied close to the stoichiometric amount by dividing a portion of a second reactant as a supplement portion with an optimized divide proportion and supplying it.

The execution of a thermal reaction via split supply of the reactant as described above can be carried out with a reaction system utilizing a general heat exchange-type reactor. In this case, the reaction system may be configured in such a form that a plurality of reactors are connected in series and the reactant is supplemented between one reactor and the subsequent reactor. In this way, the reactant can be supplied in the course of the reaction. Alternatively, a heat exchange-type reactor can be configured such that the thermal reaction can be executed via split supply of the reactant in the single reactor.

Hereinbelow, embodiments of the present disclosure will be described in detail with reference to the drawing. It is noted that the dimensions and the materials as well as the specific numerical values and so on described in the embodiments are mere examples for facilitating the understanding of the disclosed content, and are not intended to limit the present disclosure unless otherwise noted. Further, in the description and the drawings of the present application, redundant description of elements having substantially the same function and configuration will be omitted by denoting them with the same reference sign, and illustration of elements that are not directly related to the present disclosure will be omitted.

Figure 1:
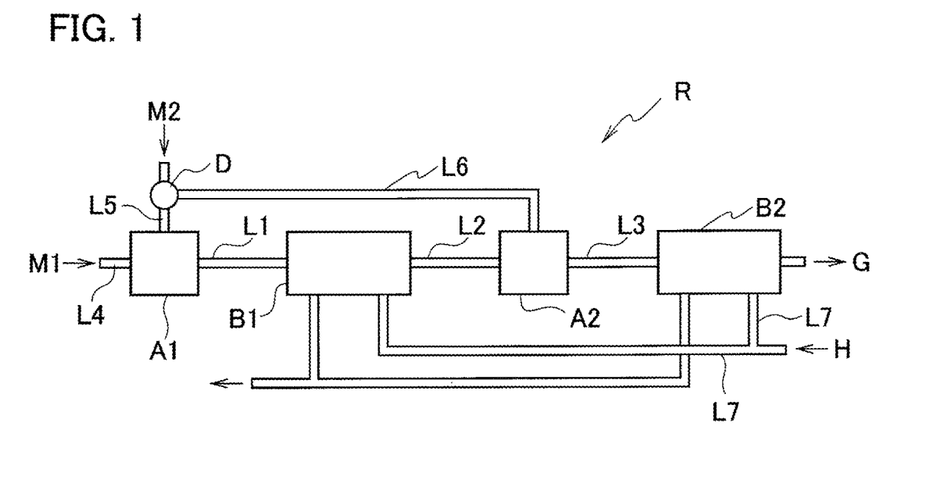
FIG. 1 is an explanatory diagram for schematically illustrating the basic configuration of a reaction system.

First, a reaction system of the present disclosure will be briefly described with reference to FIG. 1 schematically illustrating the basic configuration of a reaction system capable of executing a thermal reaction via split supply of the reactant. FIG. 1 illustrates one embodiment of a reaction system configured using a typical heat exchange-type reactor, and steam and a hydrocarbon are supplied, respectively, as a first reactant M1 and a second reactant M2 to the reaction system.

A reaction system R of FIG. 1 has a first mixing unit A1, a first reaction unit B1, a second mixing unit A2, and a second reaction unit B2, which are connected to each other in series by lines L, L2, and L3. The first mixing unit A1 and the second mixing unit A2 are apparatuses that prepare a mixture fluid containing the first reactant and the second reactant. Each of them may only need to be one capable of preparing a mixture fluid by mixing fluids uniformly and is preferably a gas mixer used for preparing a mixture gas by mixing steam and a hydrocarbon in a typical reforming operation. However, these units are not limited to it but may be, for example, mechanisms equipped with a flow control function equivalent to that of the mixer by using a flow rate adjustment valve or a switch valve. Each of the first reaction unit B1 and the second reaction unit B2 is configured using a reactor that heats a prepared mixture fluid to cause a thermal reaction to progress, and functions as a reformer that heats the mixture gas, prepared from steam and the hydrocarbon, to the reforming temperature of the hydrocarbon to cause the reforming reaction of the hydrocarbon to progress. A heat exchange-type reactor is suitably used as the reactor constituting the first reaction unit B1 and the second reaction unit B2. The heat exchange-type reactor includes a heat exchanging body having therein a reaction flow channel and a heat medium flow channel, and heats the supplied mixture gas via heat exchange with a heat medium fluid. The reactors employed as the first reaction unit B1 and the second reaction unit B2 may be selected as appropriate from reactors of various configurations which are generally utilized for reforming reactions. Disposing a reforming catalyst inside the reaction flow channel promotes the reforming reaction. In view of ease in handling and the like, it is suitable to prepare a catalytic body by supporting the catalyst on a structural member, and the catalytic body can be attached to the inside of the reaction flow channel in a simple manner by loading this into the reaction flow channel. Also, a heat transfer member made of a heat conductive material may be placed inside the heat medium flow channel as necessary. This member promotes the heat transfer from the heat medium fluid to the heat exchanging body. A heat transfer member of a corrugated shape is suitably utilized.

Examples of the reforming catalyst include catalysts containing an active metal as a catalytic component such as Ni (nickel), Co (cobalt), Fe (iron), Pt (platinum), Ru (ruthenium), Rh (rhodium), or Pd (palladium). A single catalyst may be used or two or more catalysts may be used in combination as long as they are effective in promoting the reaction, and a catalyst or catalysts may be selected as appropriate from the catalysts as above to use. If supporting the catalyst on a structural member to prepare a catalytic body, it is easy to handle such catalyst. For the structural member supporting the catalyst, a metal or ceramic that is capable of forming processing and of supporting the catalyst is selected from available heat-resistant metals and ceramics. Preparing a catalytic body by shaping a thin plate-shaped structural member into a wavy shape is preferable in view of the efficiency of contact with the fluid. Also, catalytic bodies in the shapes of pellets, tablets, a honeycomb, and so on are preferable as well. Examples of the heat-resistant metal include heat-resistant alloys containing, as their main component, one or more metals such as Fe (iron), Cr (chromium), Al (aluminum), Y (yttrium), Co (cobalt), Ni (nickel), Mg (magnesium), Ti (titanium), Mo (molybdenum), W (tungsten), Nb (niobium), and Ta (tantalum). For example, the catalytic body is preferably made by processing a thin plate made of a heat-resistant alloy such as Fecralloy (registered trademark) to form the structural member. A commercially available product shaped as a corrugated plate may instead be obtained and used. As for the method of supporting the catalyst, an existing technique can be utilized to implement the method, and a suitable method may be selected as appropriate from known methods in accordance with the catalyst to be used. Specifically, there are given: a method in which the catalyst is directly supported on the structural member by surface modification or the like; a method in which the catalyst is indirectly supported by using a carrier; and so on. Practically, it is easy to support the catalyst by using a carrier. As the carrier, a material that does not impede the progress of the reaction to be carried out in the reactor, is durable, and can favorably carry the catalyst to be used is selected as appropriate. Examples of the ceramic include metal oxides such as $Al_2O_3$ (alumina), $TiO_2$ (titania), $ZrO_2$ (zirconia), $CeO_2$ (ceria), and $SiO_2$ (silica), and one or more of them can be selected and used as the carrier. A supporting method using the carrier can be selected as appropriate from known methods, and examples of the method include that in a manner of forming a layer of a mixture of the catalyst and the carrier on the surface of the shaped structural member, that in a manner of forming a carrier layer and then supporting the catalyst thereon by surface modification or the like, and so on.

In FIG. 1, a supply line L4 for the first reactant M1 (water vapor) is connected to the first mixing unit A1, while a supply line for the second reactant M2 (hydrocarbon) is branched into supply lines L5 and L6 and connected to the first mixing unit A1 and the second mixing unit A2, respectively. The second reactant M2 is therefore divided and supplied separately to the first mixing unit A1 and to the second mixing unit A2. A distributor D capable of adjusting the distribution proportions of the second reactant M2 to be supplied to the first mixing unit A1 and to the second mixing unit A2 is installed at the branching portion toward the supply lines L5 and L6. Also, a line L7 through which a heat medium fluid H for heating is to be supplied is connected to the first reaction unit B1 and the second reaction unit B2. Fluidic substances that do not corrode the constituent materials of the reactors are usable as the heat medium fluid H. For example, liquid substances such as water and oil and gaseous substances such as a combustion gas are usable. A configuration using a gaseous substance as the heat medium fluid is easy to handle as compared to the case of using a liquid medium.

In the reaction system R of FIG. 1, as the first reactant M1 and a portion of the second reactant M2 are supplied to the first mixing unit A1, a mixture fluid, i.e. a mixture gas of steam and the hydrocarbon gas added thereto is prepared. This mixture gas is supplied as a reaction fluid to the first reaction unit B1 and heated by heat exchange with the heat medium fluid H, so that the reforming reaction progresses. Also, the progress of the reforming reaction is promoted by the catalyst inside the reaction flow channel. The reaction fluid (primary reformed gas) consequently discharged from the first reaction unit B1 contains hydrogen and carbon monoxide produced by the reforming reaction. The hydrocarbon is consumed, and the equivalent amount of water vapor to the reacted hydrocarbon is consumed. As the shift reaction progresses during this period, carbon dioxide and hydrogen are produced as a result of the carbon monoxide and the water vapor acting on each other. The reaction fluid (primary reformed gas) is supplied to the second mixing unit A2 where it is supplemented with the remaining portion of the second reactant M2, and is then supplied to the second reaction unit B2 where it is heated similarly by the heat medium fluid H so that the reforming reaction progresses. At the second reaction unit B2, hydrogen is produced from the second reactant M2 supplemented at the second mixing unit A2. Accordingly, the hydrogen concentration of the reaction fluid (final reformed gas G) discharged from the second reaction unit B2 is higher.

In this reaction system R, the two heat exchanging bodies of the reactors constituting the first reaction unit B1 and the second reaction unit B2 form a discontinuous reaction flow channel formed of a first stage and a second stage, and the steam as the first reactant flows through the first stage and the second stage of the reaction flow channel. In regard to the hydrocarbon as the second reactant, a portion of it flows through the first stage of the reaction flow channel along with the steam, while the remaining portion is supplemented to the reaction fluid at an intermediate portion (i.e. the second mixing unit A2 between the first stage and the second stage) of the reaction flow channel. Thus, the second mixing unit A2 to which a supply line for the second reactant M2 is connected forms a supplement channel to supplement the second reactant at an intermediate portion of the reaction flow channel. With a configuration in which the mixing unit and the reaction unit are connected repetitively in series as described above, split supply of the second reactant can be carried out, and the number of dividing the supply can be changed by changing the number of repetitions of the mixing unit and the reaction unit.

The progress of the steam reforming reaction of a hydrocarbon is dependent on the gas pressure and the reaction temperature and also varies depending on the type of the catalyst. However, the steam reforming reaction usually progresses at a temperature of about 500° C. On the other hand, deposition of carbon also occurs in a high temperature range and is likely to significantly occur in a range not lower than about 650° C. For this reason, in steam reforming of a natural gas, the reaction is generally caused to progress by supplying steam in an S/C ratio of about 2 to 3.5, wherein the heating conditions are set such that the final temperature can be about 700 to 950° C. While the progress of the reaction varies depending on the gas pressure, the heating temperature can be set as appropriate in accordance with the pressure (usually about 1 to 50 bar) of the gas to be supplied as the raw material such that suitable progress can be achieved. The reaction system R of FIG. 1 can also employ such heating temperatures, and the heating temperatures at the first reaction unit B1 and the second reaction unit B2 may be set as appropriate within the above temperature range, with the optimum temperature for the catalyst to be used taken into consideration. The S/C ratio is preferably 1.2 or higher at a temperature of 600° C. and 1.5 or higher at a temperature of 900° C. In a case of reforming of a gas with a large number of carbon atoms, such as Naphtha and LPG, a higher S/C ratio than those with natural gases is employed. As mentioned above, according to approximate calculation, if the split supply of the second reactant M2 is performed such that the divide proportion a of the supplemental portion of the hydrocarbon (the proportion of the hydrocarbon to be supplied to the second mixing unit A2) is about 0.4 ($=\alpha e$), the smallest value of the S/C ratio in the reaction flow channel is to be in the range of 2.5 to 3 when steam is supplied at a flow rate that is about 1.6 to 1.8 times larger than its stoichiometric amount with respect to the total flow rate of the second reactant M2 to be supplied. Hence, the S/C ratio of the reaction fluid flowing through the reaction flow channel is always a value not smaller than this range. Thus, based on a suitable S/C ratio determined from the gas composition of the second reactant M2 to be used, a value that allows $Xi=Xm$ may be obtained as the smallest value of the S/C ratio in the reaction flow channel, and the proportion $\alpha e$ of the supplemental portion and the ratio N of the flow rate of steam to the total flow rate of the second reactant M2 to be supplied may be determined such that the above-obtained value can be the suitable S/C ratio. Then, with reference to these values, conditions for the split supply can be set.

The advantage of the split supply of a reactant in the reaction system R, that is, reduction in amount of steam to be supplied, can be achieved also by setting different heating temperatures or utilizing different types of catalysts for the first reaction unit B1 and the second reaction unit B2. In this case, the proportion $\alpha e$ of the supplemental portion and the ratio N of the flow rate of steam to the total flow rate of the second reactant M2 to be supplied may be determined on the basis of the higher one of the suitable S/C ratios under the respective reaction conditions of the first reaction unit B1 and the second reaction unit B2.

In this reaction system R in which a reactant is divided and supplied, it is also possible to use carbon dioxide or mixture of steam and carbon dioxide in place of the first reactant M1. In the case of using carbon dioxide, carbon dioxide reforming is carried out and the dry reforming reaction described by formula (2) progresses.

Figure 2:
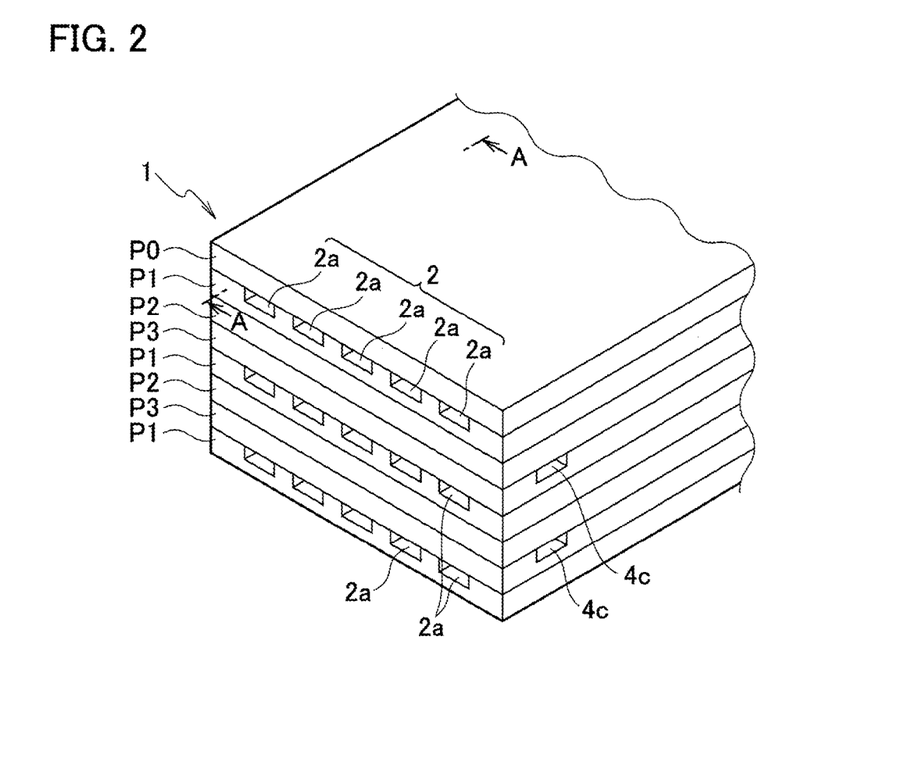
FIG. 2 is a partial perspective view illustrating one embodiment of a heat exchanging body constituting a reactor.
Figure 3:
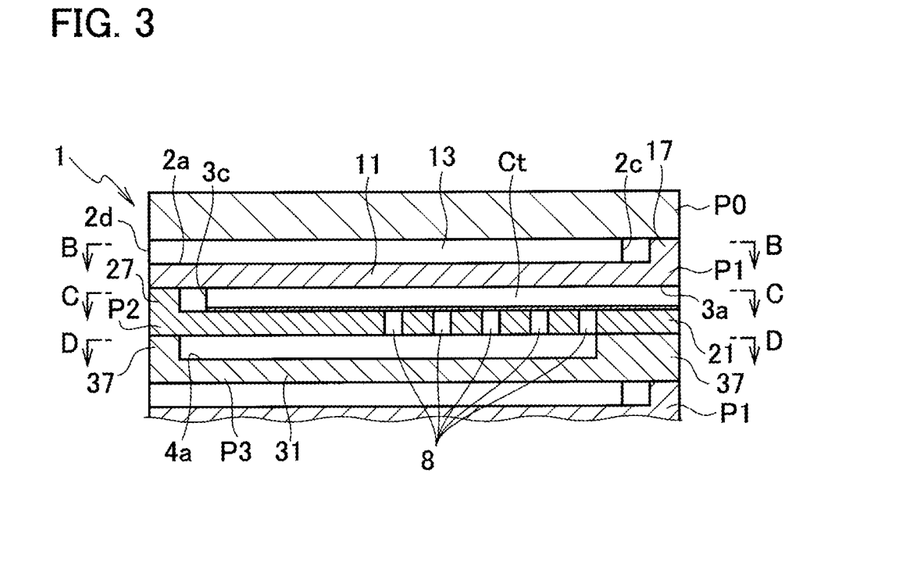
FIG. 3 is a cross-sectional view of the heat exchanging body taken along the line A-A and seen in the direction of arrows A in FIG. 2.

It is also possible to configure a single heat exchange-type reactor such that it can carry out the split supply of a reactant executed by the two reactors of the above-described reaction system R. One embodiment of such a reactor will be described with reference to FIG. 2 to FIG. 4. FIG. 2 to FIG. 4 illustrate the main portion of the heat exchange-type reactor, i.e. a heat exchanging body 1. FIG. 2 is a perspective view of the part of the heat exchanging body 1, FIG. 3 is a cross-sectional view of the heat exchanging body 1 taken along the line A-A in FIG. 2, and FIG. 4 is a set of cross-sectional views for explaining the members constituting the heat exchanging body 1, respectively.

The heat exchanging body 1 has therein heat medium flow channels 2 in which the heat medium fluid H is caused to flow, reaction flow channels 3 in which a reaction fluid F is caused to flow, and supplement channels 4 which are caused to supply a reactant at intermediate portions of the reaction flow channel. The heat medium flow channels 2, the reaction flow channels 3, and the supplement channels 4 are branched into a plurality of branch flow channels 2a, 3a, and 4a extending side by side, respectively, in order to increase the area of contact between the fluids and promote the heat transfer. The heat exchanging body 1 is configured as a multi-layer structure in which the heat medium flow channels 2, the reaction flow channels 3, and the supplement channels 4 are arranged sequentially and repetitively in the vertical direction. In the heat exchanging body 1 of FIG. 2 to FIG. 4, seven layers of five branch flow channels 2a, 3a, and 4a are formed; the branch flow channels 2a at the uppermost and lowermost layers are heat medium flow channels 2, and the branch flow channels 3a and 4a disposed between the branch flow channels 2a are the reaction flow channels 3 and the supplement channels 4. However, it is of course not necessary to limit the arrangement to this order. As illustrated in FIG. 3, the heat exchanging body 1 includes a plurality of through-holes 8 allowing communication between the branch flow channels 3a of the reaction flow channels 3 and the branch flow channels 4a of the supplement channels 4. The reactant flowing in the branch flow channels 4a of the supplement channels 4 is supplied to the branch flow channels 3a of the reaction flow channels 3 through the through-holes 8. A catalytic body Ct is attached to each of the branch flow channels 3a of the reaction flow channels 3. In order to increase the area of contact with the reaction fluid, the catalytic body Ct may be one in the shape of a corrugated plate with wavy round curves, one bent in a zigzag shape, or one in a similar shape, and is inserted in the branch flow channel 3a and fixed in close contact therewith so as to be capable of being inserted in and pulled out. The length of the catalytic body Ct preferably corresponds to the length of the branch flow channel 3a of the reaction flow channel 3 but is not limited to this.

The heat exchanging body 1 with a multi-layer structure as in FIG. 2 and FIG. 3 can be configured as an assembly using flat plates with grooves for the flow channels formed on one side. In FIG. 2, the heat exchanging body 1 is formed by sequentially stacking flat plates P1 with grooves 5 for the heat medium flow channels 2 formed therein, flat plates P2 with grooves 6 for the reaction flow channels 3 formed therein, and flat plates P3 with grooves 7 for the supplement channels 4 formed therein, and mounting a flat plate P0 (cover body) with no groove so as to cover the groove in the uppermost flat plate P1. The flat plates P0 to P3 are manufactured using flat plate members of a rectangular shape which are prepared from a heat-resistant and heat-conductive material. It is easy to perform a process of forming grooves in the heat exchanging body 1 of a flat plate stack type as above in accordance with changes in conditions associated with the split supply of the reactant. In the assembled heat exchanging body, the supplement channels that enable the split supply of the reactant are provided by forming grooves including appropriate through-holes in flat plates with a cutting tool. Each of the flat plates of the heat exchanging body of the flat plate stack type as above will be described with reference to FIG. 3 and FIG. 4.

Figure 4A:
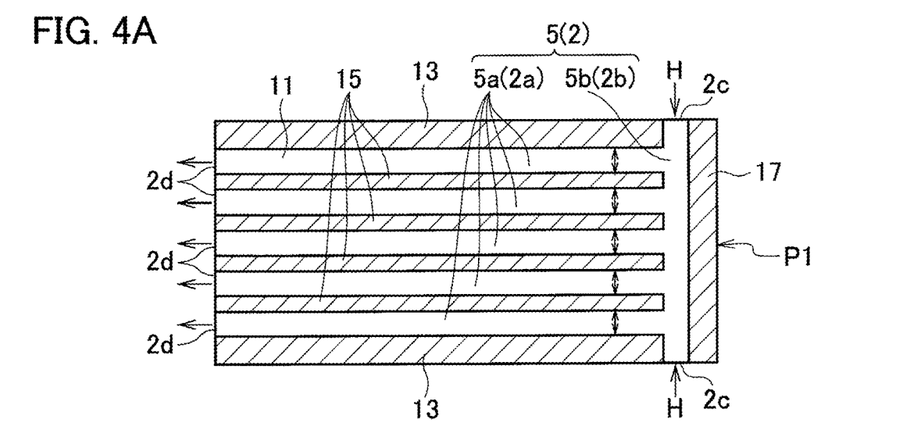
FIG. 4A is a cross section of the heat exchanging body in FIG. 3 taken along the line B-B.
Figure 4B:
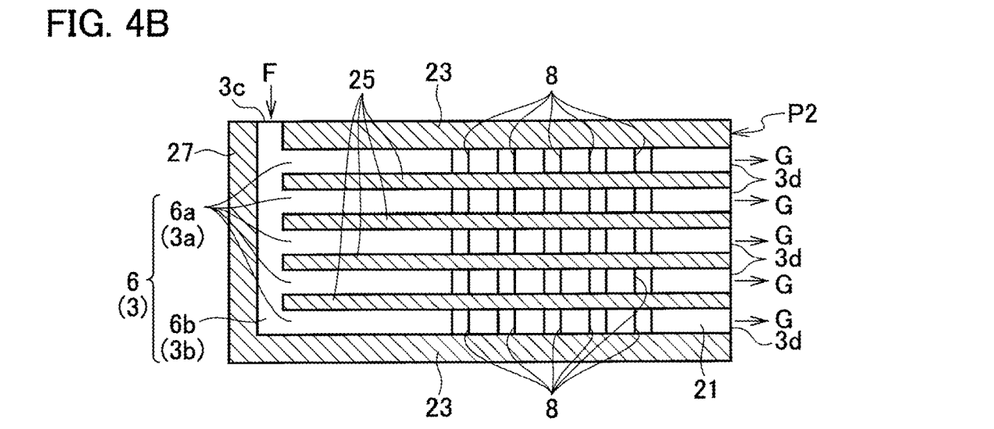
FIG. 4B is a cross section taken along the line C-C.
Figure 4C:
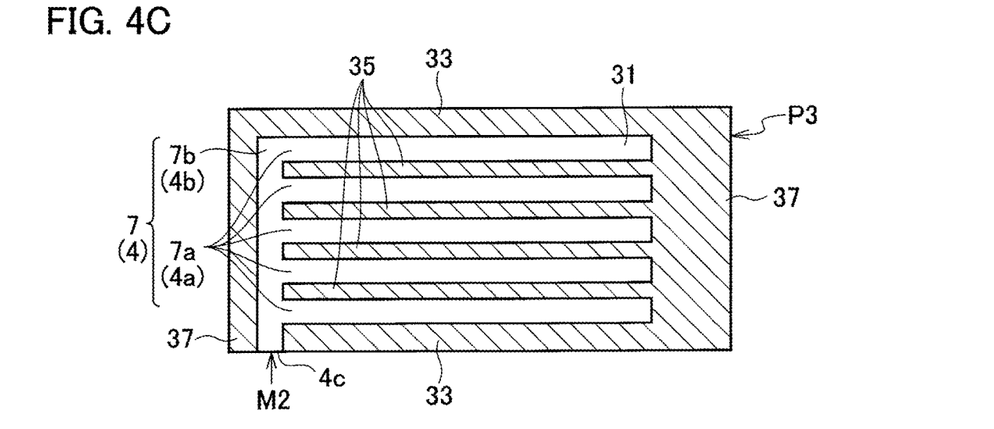
FIG. 4C is a cross section taken along the line D-D.

FIG. 4 is a cross-sectional view of the heat exchanging body 1 for explaining a form of the grooves in each of the flat plates constituting the heat exchanging body 1. FIG. 4A illustrates a cross section of one of the flat plates P1, in which the grooves 5 for the heat medium flow channels 2 are formed, taken along the line B-B in FIG. 3. FIG. 4B illustrates a cross section of one of the flat plates P2, in which the grooves 6 for the reaction flow channels 3 are formed, taken along the line C-C in FIG. 3. FIG. 4C illustrates a cross section of one of the flat plates P3, in which the grooves 7 for the supplement channels 4 are formed, taken along the line D-D in FIG. 3. It is noted that, in the embodiment illustrated in FIG. 4, the groove 5 formed in the flat plate P1 includes grooves 5a for the branch flow channels 2a of the heat medium flow channel 2, and a groove 5b for a merge channel 2b at which the branch flow channels are joined together. The groove 6 formed in the flat plate P2 includes grooves 6a for the branch flow channels 3a of the reaction flow channel 3, and a groove 6b for a merge channel 3b at which the branch flow channels are joined together. The groove 7 formed in the flat plate P3 includes grooves 7a for the branch flow channels 4a of the supplement channel 4, and a groove 7b for a merge channel 4b at which the branch flow channels are joined together. Meanwhile, in FIG. 4B, illustration of the catalytic body Ct illustrated in FIG. 3 is omitted in order to clearly indicate the through-holes formed in the flat plate P2.

As illustrated in FIG. 4A, the flat plate P1 includes a base portion 11, sidewall portions 13, intermediate wall portions 15, and an end wall portion 17. With the flat plate P0 (or the flat plate P3) stacked on the flat plate P1, the groove 5 in the flat plate P1 forms the heat medium flow channel 2. The base portion 11 defines the bottom surface of the heat medium flow channel 2. The sidewall portions 13, the intermediate wall portions 15, and the end wall portion 17 are provided to stand on the base portion 11 so as to define side surfaces of the heat medium flow channel 2. The lower surface of the flat plate P0 (or the flat plate P3) defines the upper surface of the heat medium flow channel 2. The sidewall portions 13 and the end wall portion 17 are provided along three ends of the flat plate P1. The intermediate wall portions 15 are formed in parallel and at equal intervals, between the sidewall portions 13 of opposite sides. The grooves 5a extend side by side at equal intervals via the intermediate wall portions 15, and one end of each of them is connected perpendicularly to the groove 5b. The opposite ends of the groove 5b penetrate through the sidewall portions 13 and are open to the outside, thereby forming inlet ports 2c of the heat medium flow channel 2 in the stacked state. The opposite end of each groove 5a is open to the outside, thereby forming a discharge port 2d of the heat medium flow channel 2 in the stacked state. In the state where the flat plate P0 (or the flat plate P3) is stacked, the grooves 5a and 5b form a heat medium flow channel 2 including a plurality of (five in this embodiment) branch flow channels 2a and a merge channel 2b whose cross sections perpendicular to the flow direction are rectangular. If the heat medium fluid H is introduced from the two inlet ports 2c, the heat medium fluid H sequentially flows through the merge channel 2b and the branch flow channels 2a and flows out from the discharge ports 2d. A heat transfer member that promotes the transfer of heat from the heat medium fluid may be disposed in each of the branch flow channels 2a of the heat medium flow channel 2 as necessary. A corrugated plate generally used as heat dissipation fins or heatsinks can be utilized as the heat transfer member. Metals such as aluminum, copper, stainless steel, steel plated with an iron-based material, naval copper, aluminum brass, and the like are suitable for the heat conductive material constituting the heat transfer member.

The flat plate P2, in which the groove 6 for the reaction flow channel 3 is formed, has a similar configuration to the flat plate P1, but is different in that it includes the through-holes 8 through which it receives supply of the reactant from the supplement channel 4. Specifically, as illustrated in FIG. 4B, the flat plate P2 includes a base portion 21, sidewall portions 23, intermediate wall portions 25, and an end wall portion 27. With the flat plate P1 stacked on the flat plate P2, the groove 6 in the flat plate P2 forms the reaction flow channel 3. The base portion 21 defines the bottom surface of the reaction flow channel 3. The sidewall portions 23, the intermediate wall portions 25, and the end wall portion 27 are provided to stand on the base portion 21 so as to define side surfaces of the reaction flow channel 3. The lower surface of the flat plate P1 is the upper surface of the reaction flow channel 3. The sidewall portions 23 and the end wall portion 27 are provided along three ends of the flat plate P2. The intermediate wall portions 25 are formed in parallel and at equal intervals, between the sidewall portions 23 of opposite sides. The grooves 6a extend side by side at equal intervals via the intermediate wall portions 25, and one end of each of them is connected perpendicularly to the groove 6b. One end of the groove 6b penetrates through one of the sidewall portions 23 and is open to the outside, thereby forming an inlet port 3c of the reaction flow channel 3 in the stacked state. The opposite end of each groove 6a is open to the outside, thereby forming a discharge port 3d of the reaction flow channel 3 in the stacked state. Thus, in the state where the flat plate P1 is stacked on the flat plate P2, thereby forming a heat exchanging body, the grooves 6a and 6b form a reaction flow channel 3 including a plurality of (five in this embodiment) branch flow channels 3a and a merge channel 3b whose cross sections perpendicular to the flow direction are rectangular. The catalytic bodies Ct (not illustrated in FIG. 4B) are installed in the branch flow channels 3a of the reaction flow channel 3. If the reaction fluid F is introduced from the inlet port 3c, the reaction fluid F sequentially flows through the merge channel 3b and the branch flow channels 3a, thereby coming into contact with the catalytic bodies Ct, and then flows out from the plurality of discharge ports 3d. The catalytic bodies Ct can be mounted into the branch flow channels 3a of the reaction flow channel 3 either before or after assembling the heat exchanging body 1. The catalytic bodies Ct can be mounted after the assembly by inserting them from the discharge ports 3d. The inlet port 3c of the reaction flow channel 3 is located on the side opposite to the inlet ports 2c of the heat medium flow channel 2. Hence, the assembled heat exchanging body 1 is configured in a counter-flow type design in which the heat medium fluid H and the reaction fluid F flow in opposite directions. However, this can be changed to a co-current type design by reversing the supply and discharge of the heat medium fluid H.

The flat plate P3, in which the groove 7 for the supplement channel 4 is formed, has a similar configuration to the flat plate P1, but the groove 7 is formed such that the supplement channel 4 includes only an inlet port 4c. Specifically, as illustrated in FIG. 4C, the flat plate P3 includes a base portion 31, sidewall portions 33, intermediate wall portions 35, and end wall portions 37. With the flat plate P2 stacked on the flat plate P3, the groove 7 in the flat plate P3 forms the supplement channel 4. The base portion 31 defines the bottom surface of the supplement channel 4. The sidewall portions 33, the intermediate wall portions 35, and the end wall portions 37 are provided to stand on the base portion 31 so as to define side surfaces of the supplement channel 4. The lower surface of the flat plate P2 is the upper surface of the supplement channel 4. The sidewall portions 33 and the end wall portions 37 are provided along the four ends of the flat plate P3. The intermediate wall portions 35 are formed in parallel and at equal intervals, between the sidewall portions 33 of opposite sides. The grooves 7a extend side by side at equal intervals via the intermediate wall portions 35, and one end of each of them is connected perpendicularly to the groove 7b. One end of the groove 7b penetrates through one of the sidewall portions 33 and is open to the outside, thereby forming the inlet port 4c of the supplement channel 4 in the stacked state. The opposite end of each groove 7a is closed. Here, the plurality of through-holes 8 are provided in the base portion 21 of the flat plate P2 at intermediate portions of each groove 6a, so that the lower side of the flat plate P2 and the grooves 6a communicate with each other through the through-holes 8. Hence, in the stacked state, the branch flow channels 4a of the supplement channel 4 in the flat plate P3 are connected to the branch flow channels 3a of the reaction flow channel 3 in the flat plate P2 through the through-holes 8. Then, in the state where a heat exchanging body is formed, if the second reactant M2 is introduced from the inlet port 4c, the second reactant M2 sequentially flows through the merge channel 4b and the branch flow channels 4a and then flows into the branch flow channels 3a of the reaction flow channel 3 through the through-holes 8. The grooves 7a and 7b form a supplement channel 4 including a plurality of (five in this embodiment) branch flow channels 4a and a merge channel 4b whose cross sections perpendicular to the flow direction are rectangular. Since it is sufficient for the supplement channel 4 to be capable of providing supplement through the through-holes 8 of the flat plate P2, the branch flow channels 4a of the supplement channel 4 are formed to have such a length as to reach the through-hole 8 at the most downstream side of the reaction flow channel 3.

As understood from the above, the split supply of the second reactant M2 can be appropriately adjusted based on the setting of the through-holes 8, which are provided in the base portion 21 of the flat plate P2 at intermediate portions of the grooves 6a. Specifically, when the number of through-holes 8 provided per branch flow channel (i.e. the number of supplement stages) is one, the second reactant M2 is divided into two portions and supplied, and when the number of through-holes 8 is n, the second reactant M2 is divided into (n+1) portions and supplied. Further, the timing to supplement the second reactant M2 is determined by the position of the through-holes 8. Furthermore, the flow rate of the second reactant M2 flowing through through-holes 8 can be regulated to some extent, based on the opening area of the through-hole 8. Then, in the case where a plurality of through-holes 8 are provided per branch flow channel, the proportions of distribution of the second reactant M2 at the split supply from the supplement channel into the reaction flow channel can be adjusted to some extent, based on the opening area of each of the through-holes 8.

In the above description, a fluid containing the first reactant M1 and the second reactant M2, i.e. a mixture gas of steam and a hydrocarbon is supplied as the reaction fluid F to the reaction flow channels 3 of the heat exchanging body 1. However, the heat exchanging body 1 illustrated in FIG. 2 to FIG. 4 can be configured to have the functions of the first mixing unit A1 and distributor D of the reaction system R in FIG. 1 as well. Specifically, each flat plate P2 is configured such that through-holes 8 are provided at the branching positions at which the reaction flow channel 3 branches into the branch flow channels 3a from the merge channel 3b, so that the second reactant M2 is mixed into the reaction fluid F at the upstream end of each branch flow channel 3a. In this case, by supplying a fluid containing only the first reactant M1 (steam) to the inlet port 3c of the reaction flow channel 3 as the reaction fluid F and supplying the second reactant M2 to the inlet port 4c of the supplement channel 4, a mixture gas of the first reactant M1 and a portion of the second reactant M2 is prepared in the reaction flow channel in the heat exchanging body 1. The reaction of the mixture gas progresses while it flows through the branch flow channels 3*a*, and it is further supplemented with the supplemental portion of the second reactant M2 at intermediate portions of the branch flow channels 3*a*.

Also, the heat exchanging body 1 of FIG. 2 to FIG. 4 can be modified into a stacked structure in which the vertical order of arrangement of the flat plates P1 to P3 is reversed. In that case, the through-holes 8, which enable supplementation of the second reactant, are formed in the base portion 31 of the flat plate P3 which includes the groove 7 for the supplement channel 4, instead of the flat plate P2 which includes the groove 6 for the reaction flow channel 3.

Figure 5:
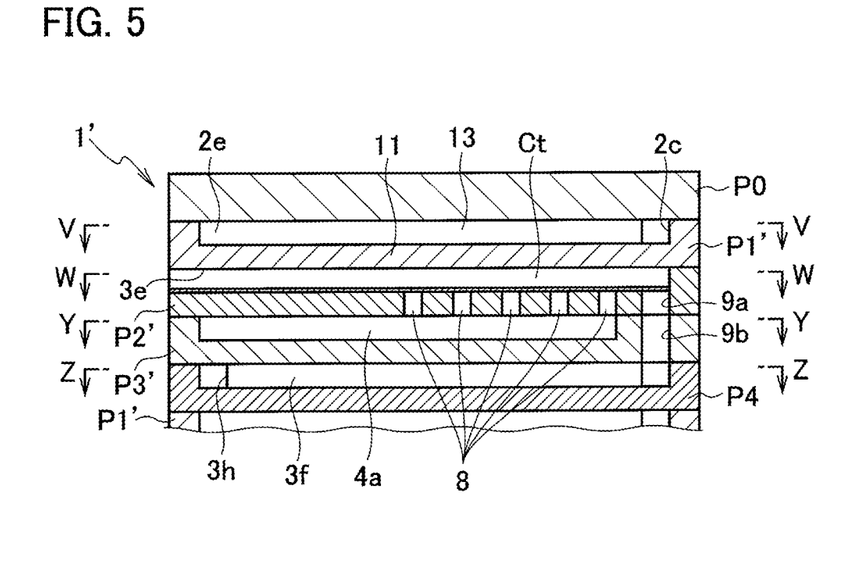
FIG. 5 is a cross-sectional view illustrating another embodiment of the heat exchanging body constituting the reactor.

The heat exchanging body 1 of FIG. 2 to FIG. 4 is configured such that three flat plates P1 to P3 form one stack unit. However, for example, as illustrated in FIG. 5, the heat exchanging body may be configured such that four flat plates form one stack unit. In this way, each reaction flow channel can be formed to turn and extend backward so that the amount of heat in the reaction fluid (reformed gas) before being discharged to the outside can be supplied to the reactant. A heat exchanging body 1' illustrated in FIG. 5 is formed by sequentially stacking a flat plate P1' with a groove for a heat medium flow channel formed therein, a flat plate P2' with a groove for forward channel of a reaction flow channel formed therein, a flat plate P3' with a groove for a supplement channel formed therein, and a flat plate P4 with a groove for backward channel of the reaction flow channel formed therein, and mounting a flat plate P0 (cover body) with no groove so as to cover the groove in the uppermost flat plate P1'. The reaction flow channel includes the forward channel in the flat plate P2' and the backward channel in the flat plate P4, and the forward channel and the backward channel are connected to each other by through-holes 9*a* and 9*b* formed in the base portion of the flat plate P2' and the end wall portion of the flat plate P3'. A catalytic body Ct is attached to a forward channel 3*e* of a reaction flow channel 3'.

FIG. 6 is a set of cross-sectional views of the heat exchanging body 1' in FIG. 5, for explaining a form of the groove in each flat plate constituting the heat exchanging body 1'. FIG. 6A illustrates a cross section of the flat plate P1' taken along the line V-V in FIG. 5. FIG. 6B illustrates a cross section of the flat plate P2' taken along the line W-W in FIG. 5. FIG. 6C illustrates a cross section of the flat plate P3' taken along the line Y-Y in FIG. 5. FIG. 6D illustrates a cross section of the flat plate P4 taken along the line Z-Z in FIG. 5. In FIG. 6B, illustration of the catalytic body Ct illustrated in FIG. 5 is omitted in order to clearly indicate the through-holes formed in the flat plate P2'.

Figure 6A:
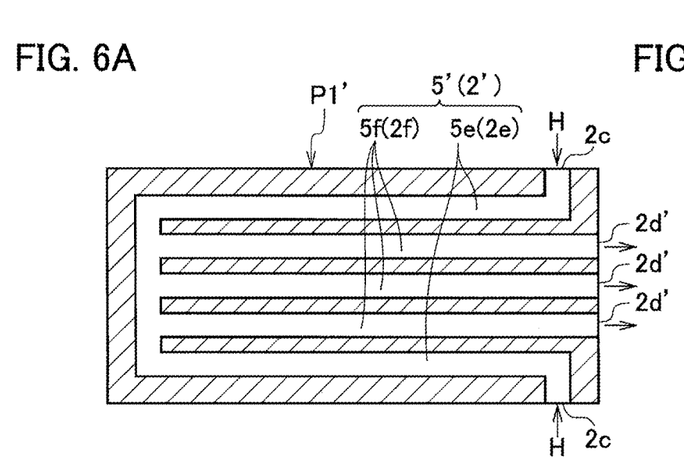
FIG. 6A is a cross section of the heat exchanging body in FIG. 5 taken along the line V-V.
Figure 6B:
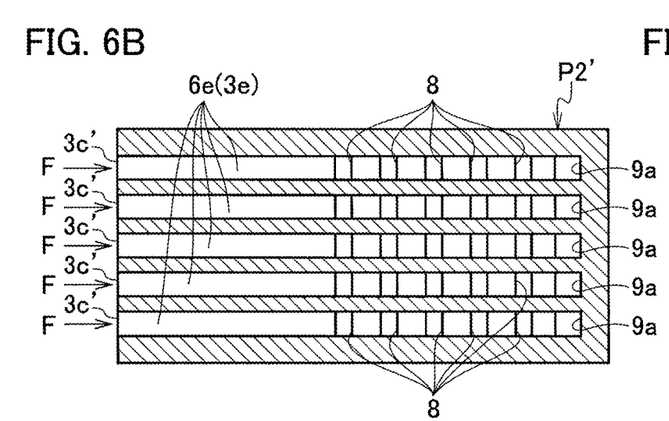
FIG. 6B is a cross section taken along the line W-W.
Figure 6C:
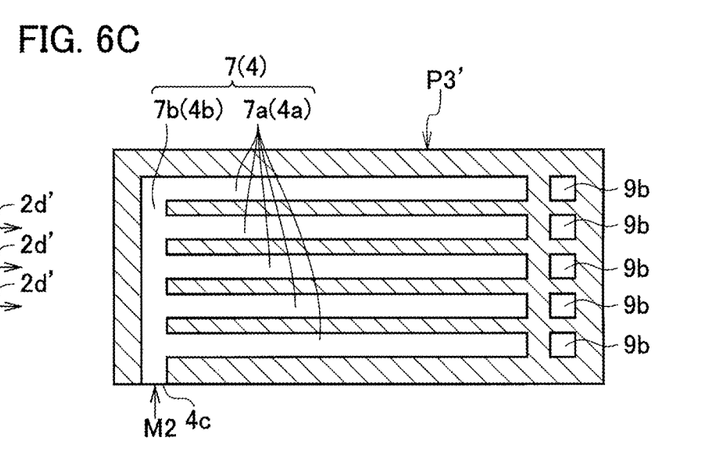
FIG. 6C is a cross section taken along the line Y-Y.
Figure 6D:
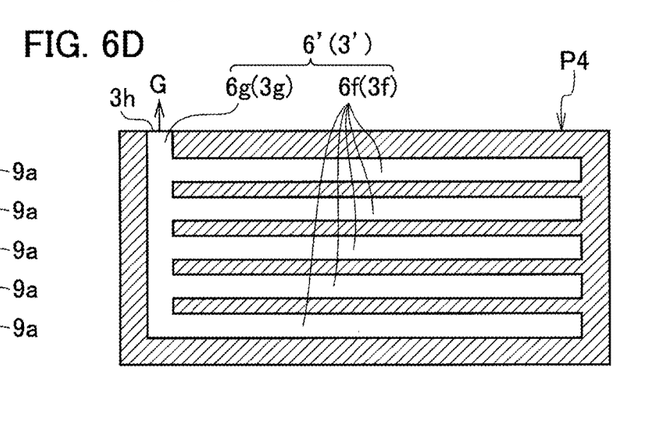
FIG. 6D is a cross section taken along line Z-Z.

As illustrated in FIG. 6A, a groove 5' formed in the flat plate P1' includes grooves 5*e* and grooves 5*f* for forming inlet channels 2*e* and outlet channels 2*f* of the heat medium flow channel 2', and the heat medium fluid H is supplied into the inlet channels 2*e* from inlet ports 2*c* formed in the sidewall portions of the flat plate P1' and discharged from discharge ports 2*d*' which are open ends of the discharge channels 2*f*. On the other hand, as illustrated in FIG. 6B and FIG. 6D, a groove 6' for forming the reaction flow channel 3' includes grooves 6*e* for the forward channels 3*e* formed in the flat plate P2', and grooves 6*f* and 6*g* for backward channels 3*f* and 3*g* formed in the flat plate P4. To connect the forward channels 3*e* and the backward channels 3*f* to each other, the through-holes 9*a*, penetrating through the base portion of the flat plate P2', are formed at the positions of the tip ends of the grooves 6*e*. Further, the through-holes 9*b*, penetrating through the end wall portion of the flat plate P3', are formed at the positions corresponding to the through-holes 9*a* of the flat plate P2' (see FIG. 6C). The flat plate P3' has substantially similar configuration to the flat plate P3 in FIG. 4C except that it includes the through-holes 9*b*. In this embodiment too, a heat transfer member that promotes the transfer of heat from the heat medium fluid can be disposed in each of the inlet channels 2*e* and the outlet channels 2*f* of the heat medium flow channel 2' as necessary. In that case, the heat transfer member is mounted into each of the grooves in the flat plate P1' before assembling the heat exchanging body 1'.

In the heat exchanging body 1', when the heat medium fluid H is supplied from the inlet ports 2*c* in opposite side surfaces of the flat plate P1', the heat medium fluid H sequentially flows through the inlet channels 2*e* and the outlet channels 2*f* and flows out from the discharge ports 2*d*'. The reaction fluid F containing the first reactant M1 (and the second reactant M2) is introduced from inlet ports 3*c*' in one end surface of the flat plate P2' into the forward channels 3*e*, which are arranged side by side, thereby coming into contact with the catalytic bodies Ct (not illustrated in FIG. 6B), so that the progress of the thermal reaction is promoted. Passing through the through-holes 9*a* and the through-holes 9*b* in the flat plate P3' from the downstream ends of the forward channels 3*e*, the reaction fluid F flows through the backward channels 3*f* in the flat plate P4, which are arranged side by side. The reaction fluid F then merges at the backward channel 3*g* and is discharged from a discharge port 3*h*. On the other hand, the second reactant M2 for supplement is supplied from an inlet port 4*c* in one side surface of the flat plate P3' into a merge channel 4*b*. While flowing through branch flow channels 4*a*, the second reactant M2 is intermittently supplied into the forward channels 3*e* of the reaction flow channel 3' through the plurality of through-holes 8 in the flat plate P2'. In a case where the temperature of the second reactant M2 (hydrocarbon) to be supplied is low, the second reactant M2 is heated by the heat of the reaction fluid (final reformed gas G) flowing through the backward channels 3*f* while flowing through the branch flow channels 4*a*. It is noted that catalytic bodies can be provided as necessary in at least part of the backward channels 3*f* of the reaction flow channel 3', in particular, in their upstream parts. In that case, the catalytic bodies are mounted into the backward channels 3*f* before the assembly. Mounting of the catalytic bodies Ct into the forward channels 3*e* of the reaction flow channel 3' is possible to perform either before or after the assembly of the heat exchanging body 1'.

Besides the above-described features, the features of the heat exchanging body 1' are similar to the heat exchanging body 1, and the description of the heat exchanging body 1 can be referred to for those. Detail description thereof will therefore be omitted.

In the above embodiments, the heat exchanging bodies have been described as a stack obtained by stacking heat transfer bodies of a flat plate shape. However, the heat exchanging bodies do not need to be a stack as above. Also, in the above embodiments, the description has been given of flow channels in which the cross section perpendicular to the flow direction has a rectangular shape. However, the cross section of the flow channel may be of a different shape such as the shape of a circle or an ellipse.

Figure 7:
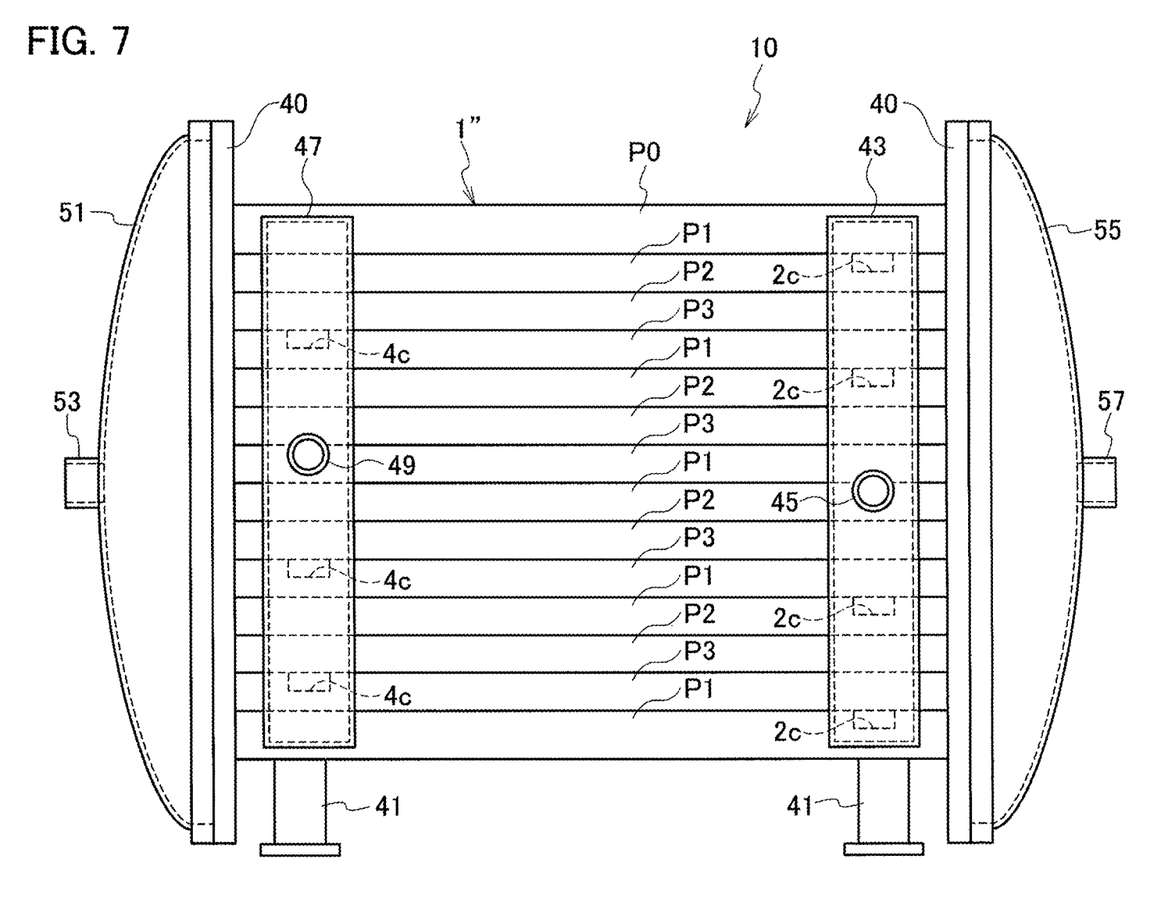
FIG. 7 is a side view illustrating one embodiment of the reactor configured using the heat exchanging body.

A reactor can be configured by using a heat exchanging body as described above as its main component. FIG. 7 illustrates one embodiment of the reactor configured by using the heat exchanging body. A heat exchanging body 1'' of a reactor 10 in FIG. 7 is configured such that three flat plates P1 to P3 form one stack unit, as in the heat exchanging body 1 in FIG. 2 to FIG. 4. Specifically, the heat exchanging body 1'' is formed by horizontally arranging the flat plates P1 to P3 and sequentially stacking them in the vertical direction and placing a flat plate P0 at the top thereof, thereby assembling them into a cuboidal stack. The heat exchanging body 1" in FIG. 7 has substantially the same structure as the heat exchanging body 1 in FIG. 2 except the number of flat plates stacked. Opposite ends of the stack are fitted into fixing members 40 of an annular quadrangle shape. Placed around the outer peripheries, the fixing members 40 fix the stacked members in tight contact with each other and thereby hold the stacked structure. In assembling the stack, its members may be firmly fixed to each other by utilizing a bonding method such as TIG (Tungsten Inert Gas) welding or diffusion bonding. In this way, decrease in heat transferability and the like due to poor contact between the members are prevented. It is noted that, although the heat exchanging body 1" can be configured by using at least one stack unit which includes flat plates P1 to P3, the larger the number of stack units, the higher the heat exchange performance. In this embodiment, the number of stack units is plural (four), the number of flat plates P1 is larger than the number of flat plates P2, P3 by one, and flat plates P1 are located at the uppermost and lowermost positions. Covering the periphery of the heat exchanging body 1" with a housing or a heat insulator so as to suppress heat dissipation from the heat exchanging body 1" is preferable for the reactor 10 in view of suppressing heat loss. The reactor 10 may be configured to include a plurality of the heat exchanging bodies 1" with a single housing covering the plurality of heat exchanging bodies 1".

The heat conductive material constituting each part of the heat exchanging body 1" can be a heat resistant metal such as an iron alloy, a nickel alloy or the like. Specific examples include heat resistant alloys such as iron alloys such as stainless steel, and nickel alloys such as Inconel 625 (registered trademark), Inconel 617 (registered trademark), and Haynes 230 (registered trademark). These heat conductive materials are preferable since they have durability (corrosion resistance) against the progress of the reaction in the reaction flow channel and combustion gases usable as the heat medium fluid. However, the material is not limited to these. Also, steel plated with an iron-based material, metal coated with a heat resistant resin such as fluororesin, carbon graphite, or the like may be used. The fixing members 40 for fixing the stack are made of a material having heat resistance and rigidity, and it is preferably a material low in heat conductivity in order to suppress the heat loss due to heat dissipation. In a case where the fixing members 40 are made of a material similar to that of the heat exchanging body 1", it is desirable to coat the fixing members 40 with a heat insulating material. Making the housing so as to be connected to the fixing members 40 on both sides is preferable in view of suppressing heat dissipation.

The heat exchanging body 1" is supported by rigid and heat-insulating support columns 41. An inlet port 2c of each heat medium flow channel and the inlet port 4c of each supplement channel are located and open at opposite end portions of one side surface of the heat exchanging body 1". Though not illustrated in FIG. 7, an inlet port of each heat medium flow channel and the inlet port of each reaction flow channel are located and open at opposite end portions of the side surface opposite to the side surface having the inlet ports 2c and the inlet ports 4c.

An elongated and hollow inlet member 43 including an opening along its longitudinal direction is attached to the side surface of the heat exchanging body 1" so as to cover the inlet ports 2c of the heat medium flow channels. As a result, a heat medium fluid supply channel connecting the inlet ports 2c in the vertical direction is formed therein. An inlet pipe 45 is connected to the center of the inlet member 43. Though not illustrated, an elongated and hollow inlet member is attached to the opposite side surface so as to cover the inlet ports of the heat medium flow channels as well. As a result, a heat medium fluid supply channel is formed therein. Similarly, an elongated and hollow inlet member 47 including an opening along its longitudinal direction is attached to the side surface of the heat exchanging body 1" so as to cover the inlet ports 4c of the supplement channels. As a result, second reactant supply channel connecting the inlet ports 4c in the vertical direction is formed therein. Though not illustrated, an elongated and hollow inlet member is attached to the opposite side surface so as to cover the inlet ports of the reaction flow channels as well. As a result, a reaction fluid supply channel is formed therein. An inlet pipe 49 is connected to the center of the inlet member 47.

With a mixer equivalent to the first mixing unit A1 of the reaction system R in FIG. 1 connected to the reaction fluid inlet member of the reactor 10, a reaction fluid containing the first reactant and a portion of the second reactant can be prepared by the mixer and supplied to the reaction flow channels of the reactor 10. In this case, the supply line for the second reactant is branched through a distributor and connected to the mixer and the reactor 10. In this way, the divide proportion of the second reactant for the split supply to the reaction flow channel and the corresponding supplement channel can be adjusted by means of the distributor. Alternatively, as mentioned earlier, the reaction fluid containing the first reactant and a portion of the second reactant can be prepared inside the reactor 10 by changing the configuration of the flat plate P2 such that it has through-holes also at the branching positions of the reaction flow channel. In that case, the portion of the second reactant M2 flows into the reaction fluid F at the upstream ends of the branch flow channels of the reaction flow channel, so that a mixture gas is prepared. In this way, the mixer and the distributor can be omitted, and a fluid containing only the first reactant M1 (steam) can be directly supplied as the reaction fluid F to the reaction flow channel of reactor 10.

Further, an end plate 51 curved in a concave shape is attached in a detachable manner or in an openable-closable manner to the side surface of the heat exchanging body 1" on the side having the discharge ports of the heat medium flow channels. The end plate 51 covers the side surface of the heat exchanging body 1" so as to form a space between the heat exchanging body 1" and the end plate 51. An outlet pipe 53 is provided in the center of the end plate 51. Thus, as the heat medium fluid is supplied from the inlet pipe 45, the heat medium fluid flows from the inlet member 43 into the inlet ports 2c and flows through the heat medium flow channels. The heat medium fluid released from the heat exchanging body 1" is discharged from the outlet pipe 53 through the space between the end plate 51 and the heat exchanging body 1". Similarly, an end plate 55 curved in a concave shape is also attached in a detachable manner or in an openable-closable manner to the side surface of the heat exchanging body 1" on the side having the discharge ports of the reaction flow channels. The end plate 55 covers the side surface of the heat exchanging body 1" so as to form a space between the heat exchanging body 1" and the end plate 55. An outlet pipe 57 is provided in the center of the end plate 55. Thus, the reaction fluid supplied from the inlet pipe flows from the inlet member into the reaction flow channels in the heat exchanging body 1". The reaction fluid released from the heat exchanging body 1" is discharged from the outlet pipe 57 through the space between the end plate 55 and the heat exchanging body 1". The second reactant for supplement is supplied from the inlet pipe 49 into the supplement channels in the heat exchanging body 1" through the inlet member 47 and the inlet ports 4c, and intermittently supplied to the reaction fluid flowing through the reaction flow channels in the heat exchanging body 1". It is noted that the direction of flow of the heat medium fluid from the inlet pipe 45 to the outlet pipe 53 can be changed to the opposite direction.

The configuration of the reactor 10 is applicable to a reactor in which its reaction flow channels have a large specific surface area per unit volume, or a so-called compact reactor. Also, the configurations of heat exchanging bodies as described above are applicable to any of a liquid-liquid heat exchanger, a gas-gas heat exchanger, and a gas-liquid heat exchanger, and the reactor 10 can handle the reaction fluid and the heat medium fluid whether they are gas or liquid. Hence, any fluid containing a substance (reactant) such as a raw material involved in a chemical reaction can be supplied as a reaction fluid to the reactor 10 to synthesize a target product. The reaction fluid may contain a carrier that is not involved in the reaction. The carrier can be selected as appropriate from substances that do not affect the progress of the reaction, with the chemical reaction to be carried out taken into consideration. Carriers usable for a gaseous reaction fluid include gaseous carriers such as an inert gas or a low-reactive gaseous substance (at the temperature inside the reactor).

By applying the reactor as above to a thermal reaction that needs a condition setting allowing the reaction to be performed with a reactant ratio different from the stoichiometric ratio due to suppression of the progress of a side reaction or other reasons associated with the progress of the reaction, the reactant ratio can be brought close to the stoichiometric ratio, thereby improving the efficiency of the chemical synthesis. Further, the above-described reactor 10 can be used to carry out chemical syntheses according to various thermal reactions (endothermic reactions, exothermic reactions).

The thermal reactions utilized for the chemical syntheses include various reactions other than the above-described steam reforming reaction and dry reforming, and the examples include e.g. exothermic reactions such as the shift reaction presented by the formula (3) below, the methanation reaction presented by the formula (4) below, and the Fischer-Tropsch synthesis reaction presented by the formula (5) below. The reaction fluids in these reactions are gaseous.

$$CO + H_2O \rightarrow CO_2 + H_2 \quad \text{Formula (3)}$$

$$CO + 3H_2 \rightarrow CH_4 + H_2O \quad \text{Formula (4)}$$

$$(2n+1)H_2 + nCO \rightarrow C_nH_{2n+2} + nH_2O \quad \text{Formula (5)}$$

Also, the technique of the present disclosure may be applied to execution of reactions other than the above such as acetylation reaction, addition reaction, alkylation reaction, dealkylation reaction, hydrogen dealkylation reaction, reductive alkylation reaction, amination reaction, aromatization reaction, arylation reaction, autothermal reforming reaction, carbonylation reaction, decarbonylation reaction, reductive carbonylation reaction, carboxylation reaction, reductive carboxylation reaction, reductive coupling reaction, condensation reaction, decomposition (cracking) reaction, hydrogen decomposition reaction, cyclization reaction, cyclooligomerization reaction, dehalogenation reaction, dimerization reaction, epoxidation reaction, esterification reaction, exchange reaction, halogenation reaction, hydrogenation reaction, hydrogen halogenation reaction, homologation reaction, hydration reaction, dehydration reaction, dehydrogenation reaction, hydrogen carboxylation reaction, hydrogen formylation reaction, hydrogenolysis reaction, hydrogen metalation reaction, hydrosilylation reaction, hydrolysis reaction, hydrotreating reaction, isomerization reaction, methylation reaction, demethylation reaction, metathesis (substitution) reaction, nitration reaction, oxidation reaction, partial oxidation reaction, polymerization reaction, reduction reaction, reverse water gas shift reaction, sulfonation reaction, telomerization reaction, transesterification reaction, and trimerization reaction.

Although embodiments of the present disclosure have been described above with reference to the accompanying drawings, the present disclosure is not limited to these embodiments. It is to be understood that various modifications and adjustments that those skilled in the art can conceive of also belong to the technical scope of the present disclosure within the scope described in the claims, as a matter of course.

With application to a heat exchange-type reactor that causes a thermal reaction involving generation or absorption of heat to progress by utilizing heat exchange with a heat medium fluid, a reactor is provided which can improve conditions and efficiency of a chemical reaction which has been carried out with a reactant ratio different from the stoichiometric ratio. This is useful for chemical syntheses with a steam reforming reaction and so on, to achieve cost reduction through improvements in durability and usage life of the reaction catalyst and also achieve stable supply of the target reaction product and reduction of the production cost.

As there are many apparently widely different embodiments of the disclosure that may be made without departing from the spirit and scope thereof, it is to be understood that the disclosure is not limited to the specific embodiments thereof, except as defined in the appended claims.

What is claimed is:

1. A reactor that causes a reaction in a reaction fluid to progress by utilizing heat exchange between a heat medium fluid and the reaction fluid, comprising:
   a heat exchanging body that has therein a heat medium flow channel in which the heat medium fluid is caused to flow, a reaction flow channel in which a reaction fluid containing a first reactant is caused to flow, and a supplement channel which is caused to supply a second reactant at an intermediate portion of the reaction flow channel;
   a catalyst that is provided in the reaction flow channel and promotes the reaction in the reaction fluid;
   a distributor that divides the second reactant into a portion and a remaining portion and is capable of adjusting a ratio of dividing the second reactant into the portion and the remaining portion; and
   a mixer that produces a mixture containing the first reactant and the portion of the second reactant divided by the distributor,
   wherein the mixer supplies the mixture as the reaction fluid to the reaction flow channel, and the distributor supplies the remaining portion of the second reactant to the supplement channel.

2. The reactor as set forth in claim 1, wherein the heat exchanging body is formed to include a plurality of holes through which the supplement channel communicates with intermediate portions of the reaction flow channel, and the second reactant is supplied to the reaction fluid in the reaction flow channel intermittently through the plurality of holes.

3. The reactor as set forth in claim 1, wherein the first reactant contains water vapor, the second reactant contains a hydrocarbon, and the reactor is in use for steam reforming of the hydrocarbon.

4. The reactor as set forth in claim 2, wherein the first reactant contains water vapor, the second reactant contains a hydrocarbon, and the reactor is in use for steam reforming of the hydrocarbon.

* * * * *